US009217800B2

(12) United States Patent
Pearce et al.

(10) Patent No.: US 9,217,800 B2
(45) Date of Patent: Dec. 22, 2015

(54) SOLID MARINE SEISMIC CABLE WITH AN ARRAY OF HYDROPHONES

(75) Inventors: Richard E. Pearce, Apache Junction, AZ (US); Jonathan W. Pearce, Morgan Hill, CA (US); Bruce A. Johnson, Antioch, CA (US); Stephen V. Cope, Cupertino, CA (US); Arturo Curiel, Milpitas, CA (US); Douglas B. Forkapa, Los Gatos, CA (US); Donald A. Kyrnitszke, Boulder Creek, CA (US)

(73) Assignee: Geometrics, INC., San Jose, CA (US)

( * ) Notice: Subject to any disclaimer, the term of this patent is extended or adjusted under 35 U.S.C. 154(b) by 698 days.

(21) Appl. No.: 13/411,468

(22) Filed: Mar. 2, 2012
(Under 37 CFR 1.47)

(65) Prior Publication Data
US 2013/0208571 A1 Aug. 15, 2013

Related U.S. Application Data

(60) Provisional application No. 61/581,058, filed on Dec. 28, 2011.

(51) Int. Cl.
*G01V 1/00* (2006.01)
*G01V 1/20* (2006.01)
*G01V 1/18* (2006.01)
G01V 13/00 (2006.01)

(52) U.S. Cl.
CPC ................ *G01V 1/201* (2013.01); *G01V 1/186* (2013.01); *G01V 13/00* (2013.01); *Y10T 29/42* (2015.01)

(58) Field of Classification Search
CPC ........ G01V 1/186; G01V 1/201; G01V 13/00; Y10T 29/42
USPC ................... 367/140, 141, 155, 157, 178, 180
See application file for complete search history.

(56) References Cited

U.S. PATENT DOCUMENTS

| | | | |
|---|---|---|---|
| 2,762,032 A * | 9/1956 | Vogel | 367/154 |
| 3,531,760 A | 9/1970 | Whitfill, Jr. | |
| 4,733,378 A | 3/1988 | Pearce et al. | |
| 4,789,971 A | 12/1988 | Powers et al. | |
| 4,958,329 A | 9/1990 | Marschall | |
| 5,257,243 A * | 10/1993 | DeChico et al. | 367/169 |
| 5,357,486 A * | 10/1994 | Pearce | 367/159 |
| 5,361,240 A * | 11/1994 | Pearce | 367/157 |
| 5,367,497 A | 11/1994 | Marschall | |
| 5,381,382 A | 1/1995 | Marschall | |
| 5,742,559 A | 4/1998 | Marschall et al. | |
| 5,742,562 A | 4/1998 | Marschall et al. | |
| 5,774,423 A | 6/1998 | Pearce et al. | |
| 5,883,857 A * | 3/1999 | Pearce | 367/20 |
| 5,982,708 A * | 11/1999 | Pearce | 367/157 |
| 6,108,267 A | 8/2000 | Pearce | |
| 6,108,274 A | 8/2000 | Pearce | |
| 6,128,251 A | 10/2000 | Erath et al. | |
| 6,239,535 B1 * | 5/2001 | Toda et al. | 310/334 |
| 6,400,065 B1 * | 6/2002 | Toda et al. | 310/334 |
| 6,411,014 B1 * | 6/2002 | Toda | 310/334 |

(Continued)

*Primary Examiner* — Luke Ratcliffe
*Assistant Examiner* — Hovhannes Baghdasaryan
(74) *Attorney, Agent, or Firm* — PatentBest; Andrew McAleavey

(57) ABSTRACT

In a first embodiment of the present invention, a hydrophone is provided comprising: a rigid tubular substrate; an annular cavity formed around the rigid tubular substrate by affixing a tubular diaphragm around the rigid tubular substrate; a flexible piezoelectric element wrapped around and bonded to the flexible tubular diaphragm; and a molded portion covering the piezoelectric element.

11 Claims, 9 Drawing Sheets

(56) References Cited

U.S. PATENT DOCUMENTS

| | | |
|---|---|---|
| 6,477,111 B1 | 11/2002 | Lunde et al. |
| 6,498,769 B1 | 12/2002 | Pearce |
| 6,580,661 B1 | 6/2003 | Marschall et al. |
| 6,614,723 B2 | 9/2003 | Pearce et al. |
| 6,819,631 B2 | 11/2004 | Pearce |
| 6,853,604 B2 | 2/2005 | Spackman et al. |
| 6,879,546 B2 | 4/2005 | Halvorsen et al. |
| 7,382,689 B2 | 6/2008 | Maples et al. |
| 7,710,819 B2 | 5/2010 | Fernihough et al. |
| 7,881,159 B2 | 2/2011 | Hegna et al. |

\* cited by examiner

SOLID MARINE SEISMIC CABLE WITH AN ARRAY OF HYDROPHONES

BACKGROUND OF THE INVENTION

1. Field of the Invention

The present invention relates to the field of marine seismic cables. More specifically, the present invention relates to a solid marine seismic cable with an array of hydrophones.

2. Description of the Related Art

As the name suggests, marine seismic cables are used to measure underwater sound. Marine seismic exploration and data acquisition is typically conducted using a vessel towing one or more cables with a plurality of measuring devices. An acoustic source is provided in the vicinity of the seismic cable, by an air-gun or various other means. The source directs acoustic energy into the earth, and some of the energy is reflected back to the surface from the different layers of rock below the surface. The returning waves are detected with sensitive measuring devices and the system accurately records the wave and the time it has taken to travel through the various layers in the earth and back to the surface. A number of processing steps may be made on these recordings such that they are transformed into visual images which give a picture of the subsurface of the earth beneath the seismic survey area. Marine seismic surveys can be conducted for a variety of reasons, including oil and gas exploration, site characterization, or other environmental investigations.

One type of measuring device that is commonly used in marine seismic surveys is a marine seismic cable. Such cables, or at least sections thereof, may contain arrays of hydrophones. A hydrophone is essentially a microphone designed to be utilized underwater. The hydrophones are assembled together along with other associated equipment and towed behind a seismic survey vessel when performing a seismic survey.

A typical cable section is 25 to 150 m long, while an assembled streamer section comprising several cable sections may be as long as 10-15 km. The hydrophones are distributed along the length of the cable, which may include spacers, strength member(s), and flotation elements, in order to render the cable section neutrally buoyant. The cable section also includes a means of electrical connection to the various hydrophones, which may be connected in various ways to form serial or parallel groups. The cable section may also contain electronics for pre-amplification and/or digitization of the acoustic signals measured by the hydrophone group(s).

A variety of methods have been used to construct such cables. In liquid-filled cables, the buoyancy is adjusted by filling the space inside an outer plastic sheath with a non-conductive fluid such as kerosene. Such cables are known to suffer from certain specific types of acoustic noise which may be transmitted through the fluid to the hydrophones ("bulge" waves). Liquid filled cables may also be easily damaged during normal operation. Also, the fluids used as fillers may be environmentally sensitive or flammable. Thus, various methods have been proposed to build solid or semi-solid streamers, which are inherently less susceptible to certain acoustic noise sources and are more ruggedly constructed to allow ease of use, handling, and deployment.

Replacing the fluid in the cable with a gel has been proposed. Gel filled streamers may still be sensitive to certain noise sources from within or outside the outer plastic sheath, and are difficult to build. Solid streamers, though more durable and substantially immune to bulge wave noise, are stiff and unwieldy during deployment. Also, such solid cables often include some means of incorporating the hydrophone array into the resulting structure using liquid-filled pockets. In summary, there has not been available a fully solid seismic cable section having the desired properties of superior acoustic performance, small diameter, rugged construction, and long-term stability, with the required flexibility and ease of use.

SUMMARY OF THE INVENTION

In a first embodiment of the present invention, a hydrophone is provided comprising: a rigid tubular substrate; an annular cavity formed around the rigid tubular substrate by affixing a tubular diaphragm around the rigid tubular substrate; a flexible piezoelectric element wrapped around and bonded to the flexible tubular diaphragm; and a molded portion covering the piezoelectric element.

In a second embodiment of the present invention, a method for forming a hydrophone is provided, comprising: fitting a tubular diaphragm around a rigid tubular substrate, forming an annular cavity around the rigid tubular substrate; wrapping a flexible piezoelectric element around the tubular diaphragm; and covering the piezoelectric element with a molded portion.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In an embodiment of the present, a fully-solid seismic cable suitable for marine use with a plurality of hydrophones is provided. Over-molding with a polyurethane or other substantially light material adds buoyancy to the cable to allow it to float without the use of liquids or gels, thus eliminating the drawbacks of prior art designs. A novel architecture in which strength members and electrical through-wires pass through the cylindrical hydrophone element is defined. The architecture and the method to assemble it are described with respect to the figures.

Figure 1A:
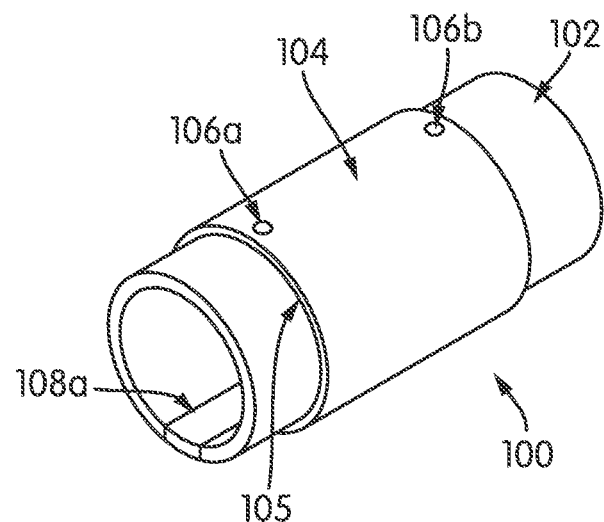
FIG. 1A is a bottom perspective view of a hydrophone base in accordance with an embodiment of the present invention.
Figure 1B:
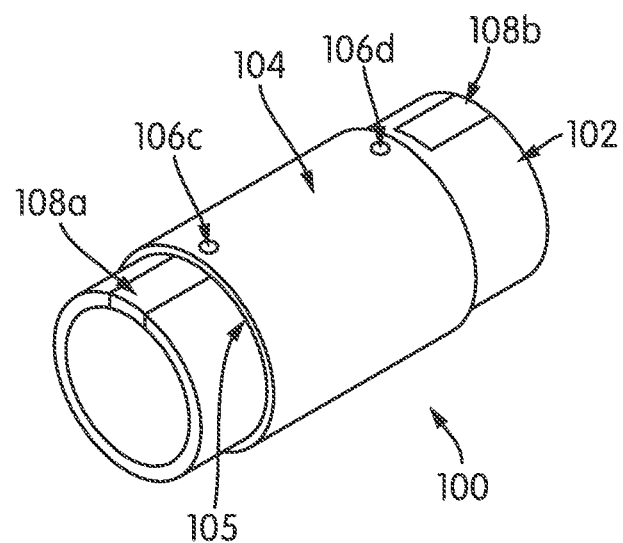
FIG. 1B is a top perspective view of the same hydrophone base as in FIG. 1A, this time rotated 180 degrees.

First, the hydrophone assembly will be discussed. FIG. 1A is a bottom perspective view of a hydrophone base in accordance with an embodiment of the present invention. FIG. 1B is a top perspective view of the same hydrophone base as in FIG. 1A, this time rotated 180 degrees. The hydrophone base 100 may be comprised of an inner tube substrate 102 and a an outer tube diaphragm 104. Included on the diaphragm 104 are two diaphragm holes on the bottom 106a, 106b, and a symmetric two diaphragm holes on the top 106c, 106d. The inner tube substrate 102 is inserted into the diaphragm 104 so that the diaphragm is positioned substantially in the center of the inner tube substrate 102 as depicted in FIGS. 1A and 1B. Glue is then inserted into the diaphragm holes 106a-106d and allowed to dry, affixing the diaphragm 104 to the inner tube substrate 102. A piece of copper tape 108 is then applied to the inner portion of the tube, with opposite ends of the tape reaching to the outer surface, as depicted in FIGS. 1A and 1B. This copper tape 108 is aligned along the center of two of the diaphragm holes 106c, 106d. The substrate 102 may comprise any suitable lightweight, rigid material, preferably conductive. The diaphragm 104 may comprise a flexible material, such as plastic, and its gluing to the substrate 102 creates a hermetically sealed annular cavity 105 around the substrate 102.

Figure 2A:
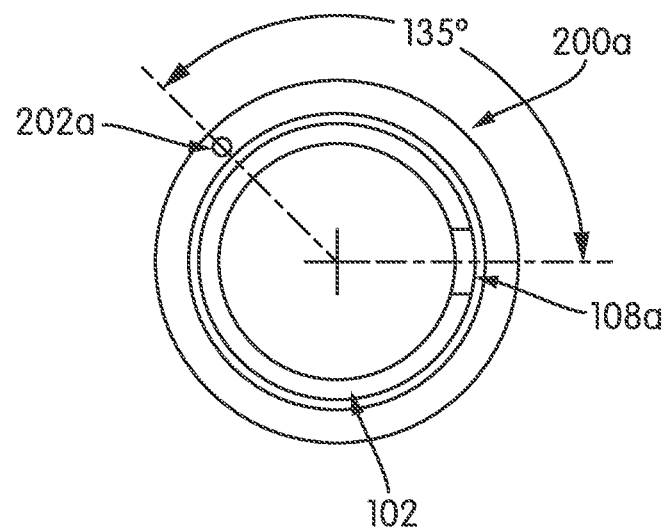
FIG. 2A is a front perspective view of the hydrophone base in accordance with an embodiment of the present invention.
Figure 2B:
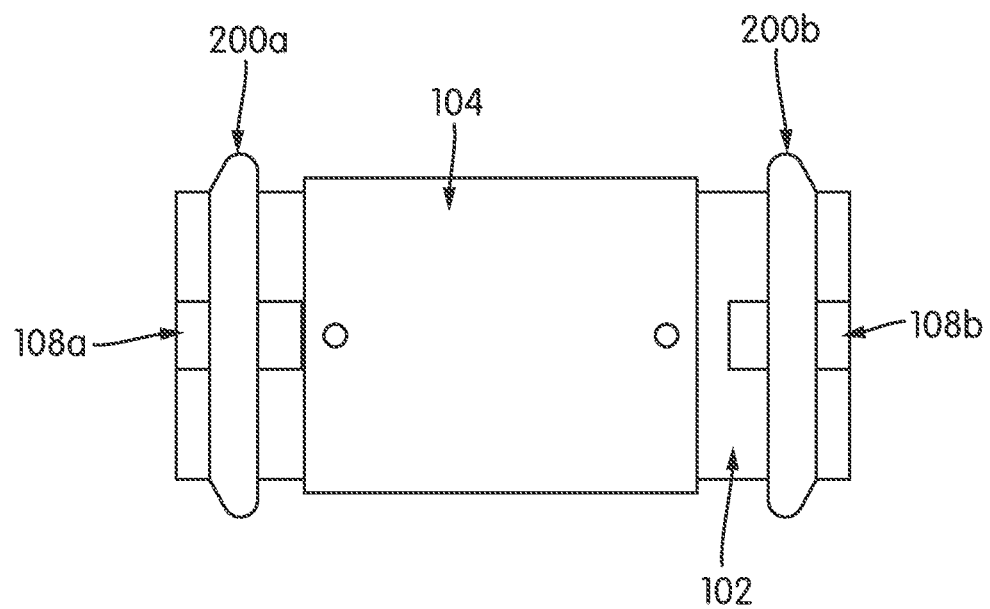
FIG. 2B is a side perspective view of the same hydrophone of FIG. 2A, in accordance with an embodiment of the present invention.

FIG. 2A is a front perspective view of the hydrophone base in accordance with an embodiment of the present invention. FIG. 2B is a side perspective view of the same hydrophone base of FIG. 2A, in accordance with an embodiment of the present invention. Here, a ring of rigid thermoplastic material 200a, 200b is molded or glued onto each end of the substrate 102. Each of the rings 200a, 200b include a hole 202a, which will eventually allow a wire to be passed through. This hole 202a is positioned approximate 135 degrees from the center of the copper tape 108a. It should be noted that the rings 200a and 200b are optional.

Figure 3A:
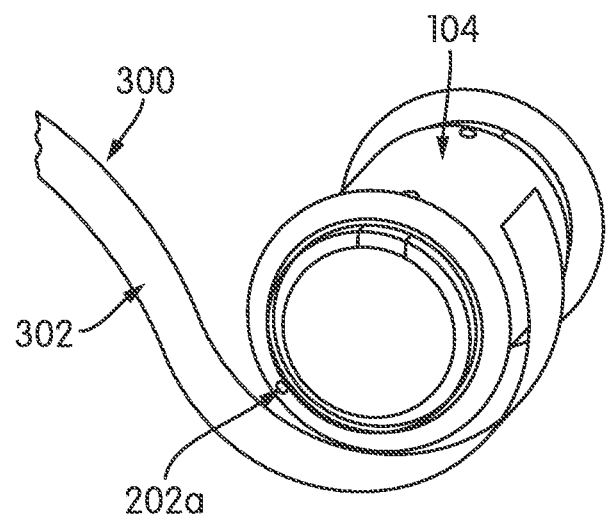
FIG. 3A is a front perspective view of the hydrophone assembly in accordance with an embodiment of the present invention.
Figure 3B:
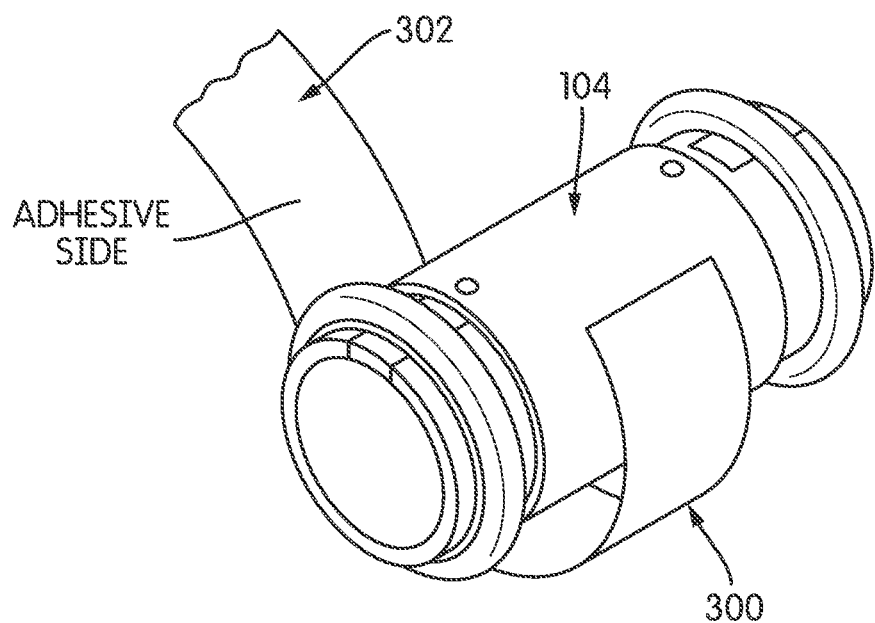
FIG. 3B is a top perspective view of the same hydrophone assembly as FIG. 3A in accordance with an embodiment of the present invention.

FIG. 3A is a front perspective view of the hydrophone assembly in accordance with an embodiment of the present invention. FIG. 3B is a top perspective view of the same hydrophone assembly as FIG. 3A in accordance with an embodiment of the present invention. A flexible piezoelectric element 300 is provided. The flexible piezoelectric element 300 may be composed of a Polyvinylidene fluoride (PVDF) film enclosed with an electrode layer, an insulating layer, and an adhesive, precut to the appropriate size and including tabs to provide electric connection. The tabs are not pictured in FIGS. 3A and 3B but will be shown later in FIG. 4. The flexible piezoelectric element 300 is wrapped around and bonded to the diaphragm 104 by applying pressure to the flexible piezoelectric element 300 until the adhesive side 302 affixes to the diaphragm 104.

Figure 4:
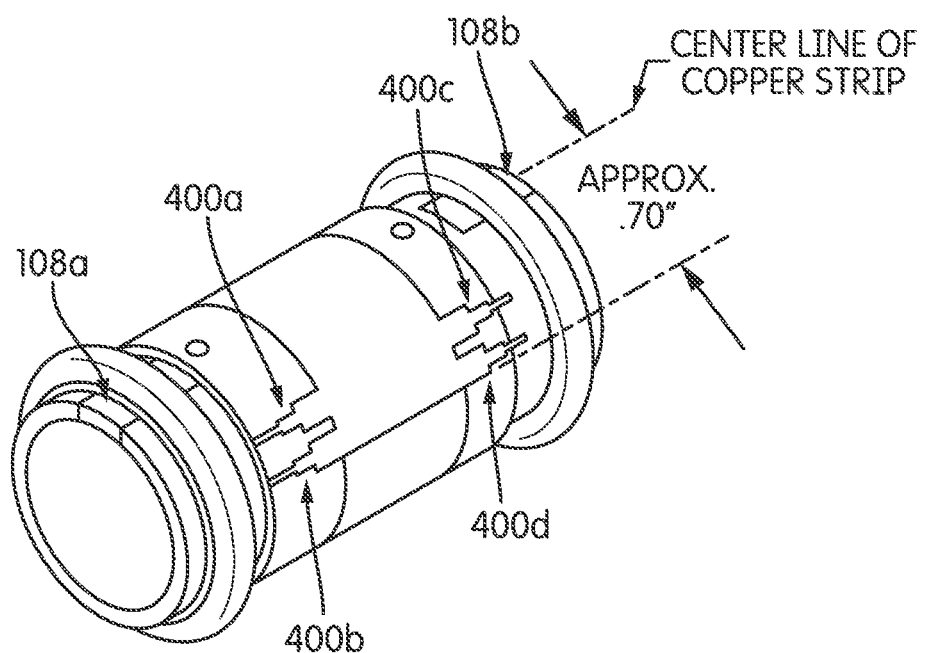
FIG. 4 is another side perspective view of the hydrophone assembly in accordance with an embodiment of the present invention.

FIG. 4 is another side perspective view of the hydrophone assembly in accordance with an embodiment of the present invention. Here, tabs 400a, 400b, 400c, and 400d are depicted. The flexible piezoelectric element 300 is aligned so that tabs 400b, 400d are approximately 180 degrees from the hole 202a.

Figure 5A:
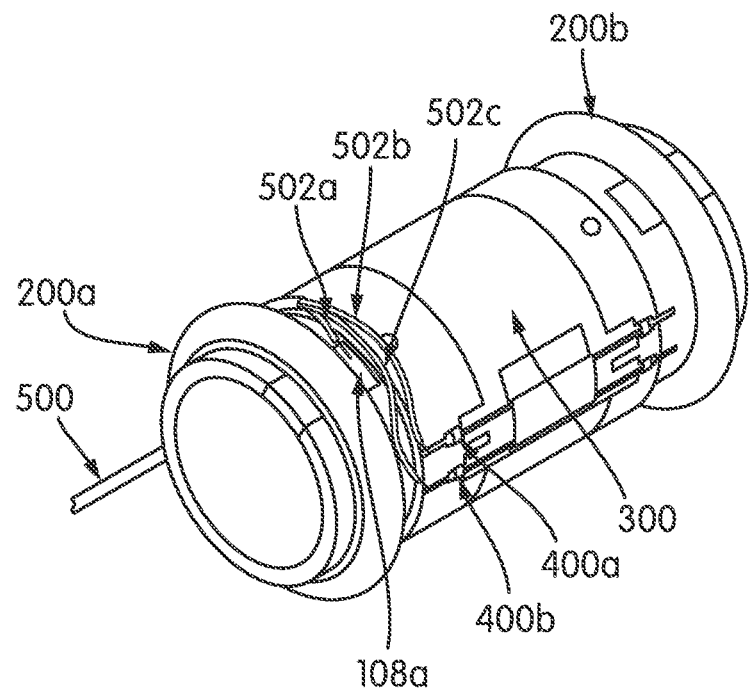
FIG. 5A is a side perspective view of the hydrophone assembly in accordance with an embodiment of the present invention.

FIG. 5A is a side perspective view of the hydrophone base in accordance with an embodiment of the present invention. A wire 500 is inserted into the hole in one of the rings 200a. In one embodiment, the wire 500 may actually comprise a twisted wire pair with shield, including a bare wire 502a, a white wire 502b, and a clear wire 502c. As depicted in FIG. 5A, the bare wire 502a may simply be soldered to the copper tape 108a. The white wire 502b may be soldered to one of the tabs 400a, while the clear wire 502c is soldered to another of the tabs 400b.

Figure 5B:
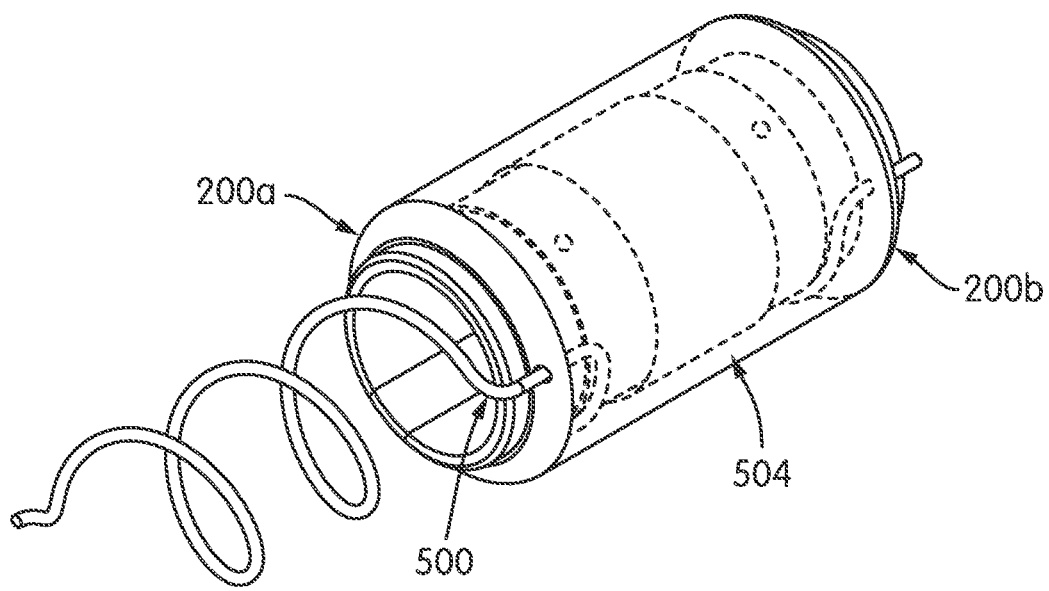
FIG. 5B is a side perspective view of the hydrophone assembly in accordance with an embodiment of the present invention.

The entire hydrophone assembly can then be overmolded with a soft plastic material filling the region between the outer rings 200a, 200b (if they are present) and over the wraps of the piezoelectric element 300. FIG. 5B is a side perspective view of the hydrophone assembly in accordance with an embodiment of the present invention. An overmold 504 protects the hydrophone assembly during the subsequent assembly process, provides an electrical insulation layer, and contributes to acoustic isolation.

Figure 6:
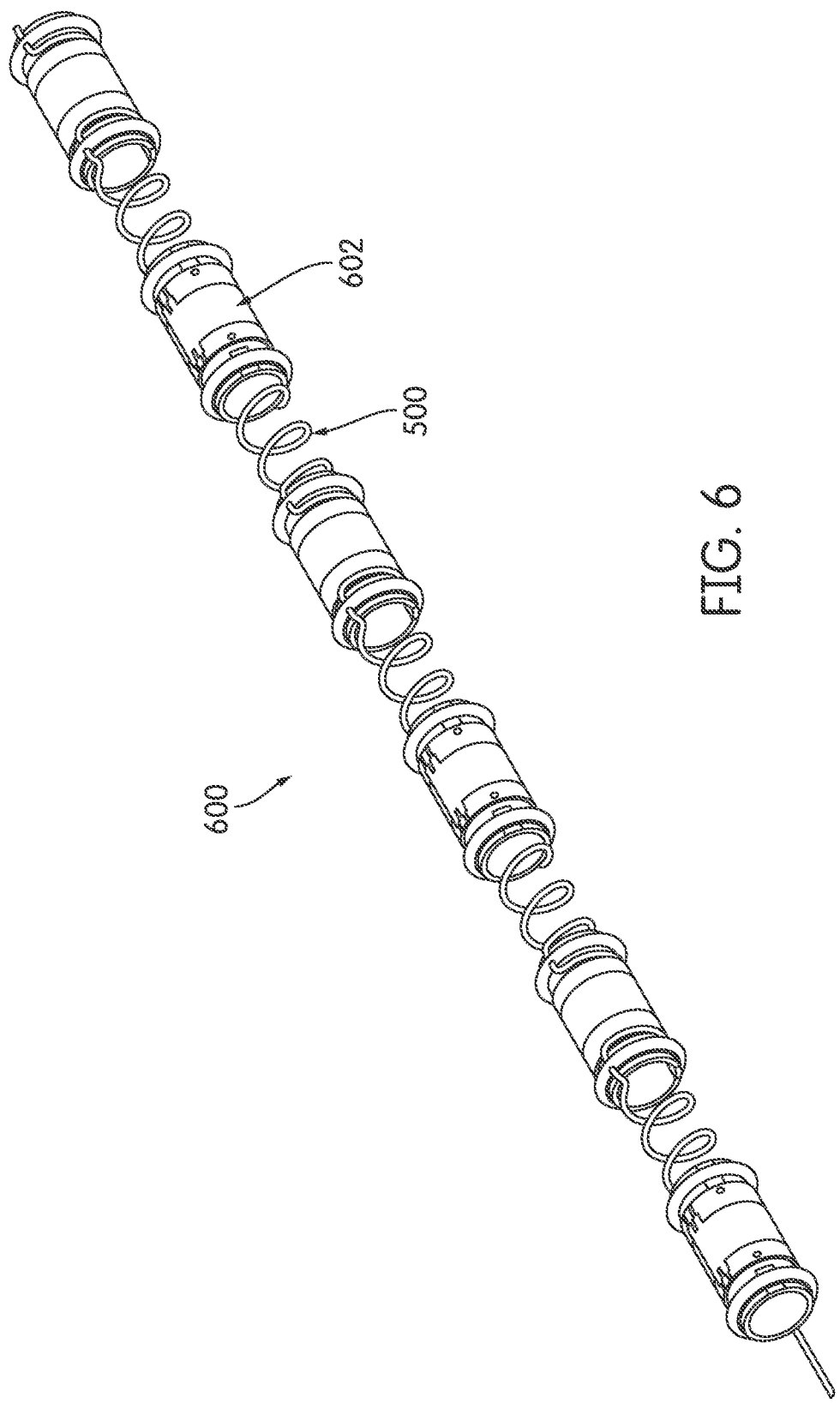
FIG. 6 is a side perspective view of a group of hydrophones in accordance with an embodiment of the present invention.

At this point, a novel hydrophone has been constructed. The hydrophone can then tied to similar or identical hydrophones for eventual use in a cable section. FIG. 6 is a side perspective view of a group of hydrophones in accordance with an embodiment of the present invention. Each hydrophone 602 is wired on each end as depicted in FIG. 5A. The wire 500 between each hydrophone 602 may be formed into a coil shape, to facilitate the later placement of the hydrophone group 600 over a central cable.

Figure 7A:
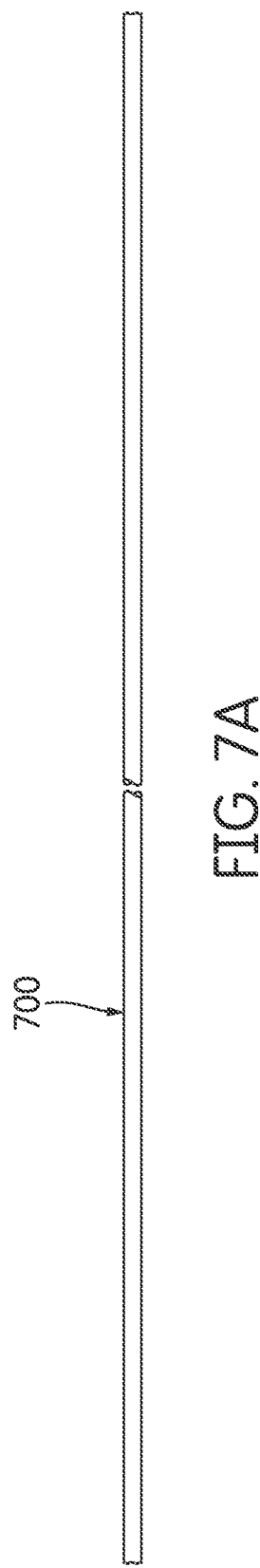
FIG. 7A is a perspective diagram illustrating a cable section in accordance with an embodiment of the present invention.

FIG. 7A is a perspective diagram illustrating a central cable in accordance with an embodiment of the present invention. This central cable 700 can include one more strength members and a number of electrical through-wires and/or optical fibers. This central cable 700 typically includes an extruded plastic sheath around the strength member and various electrical wires. The construction includes fillers to ensure a final shape which is nearly cylindrical. The sheath may be composed of a material which adheres to the molding materials used in subsequent steps.

Figure 7B:
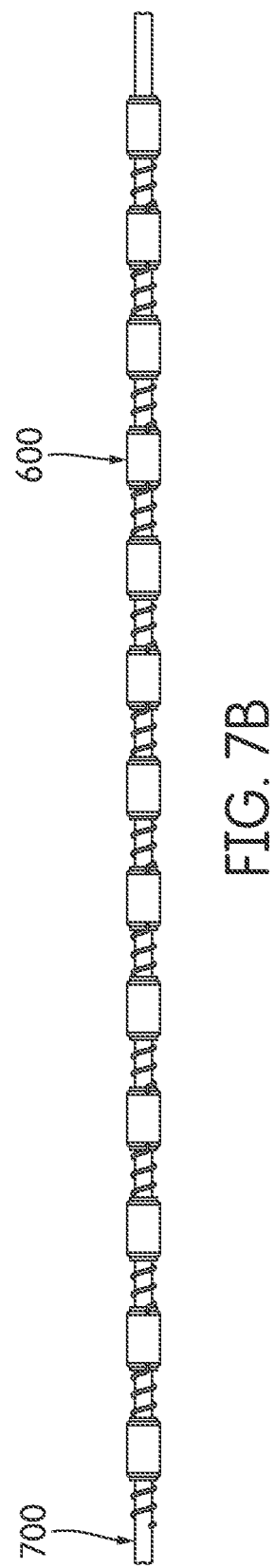
FIG. 7B is a perspective diagram showing the cable section of FIG. 7A covered by the hydrophone group of FIG. 6, as the hydrophone group is being slipped over the cable section.
Figure 7C:
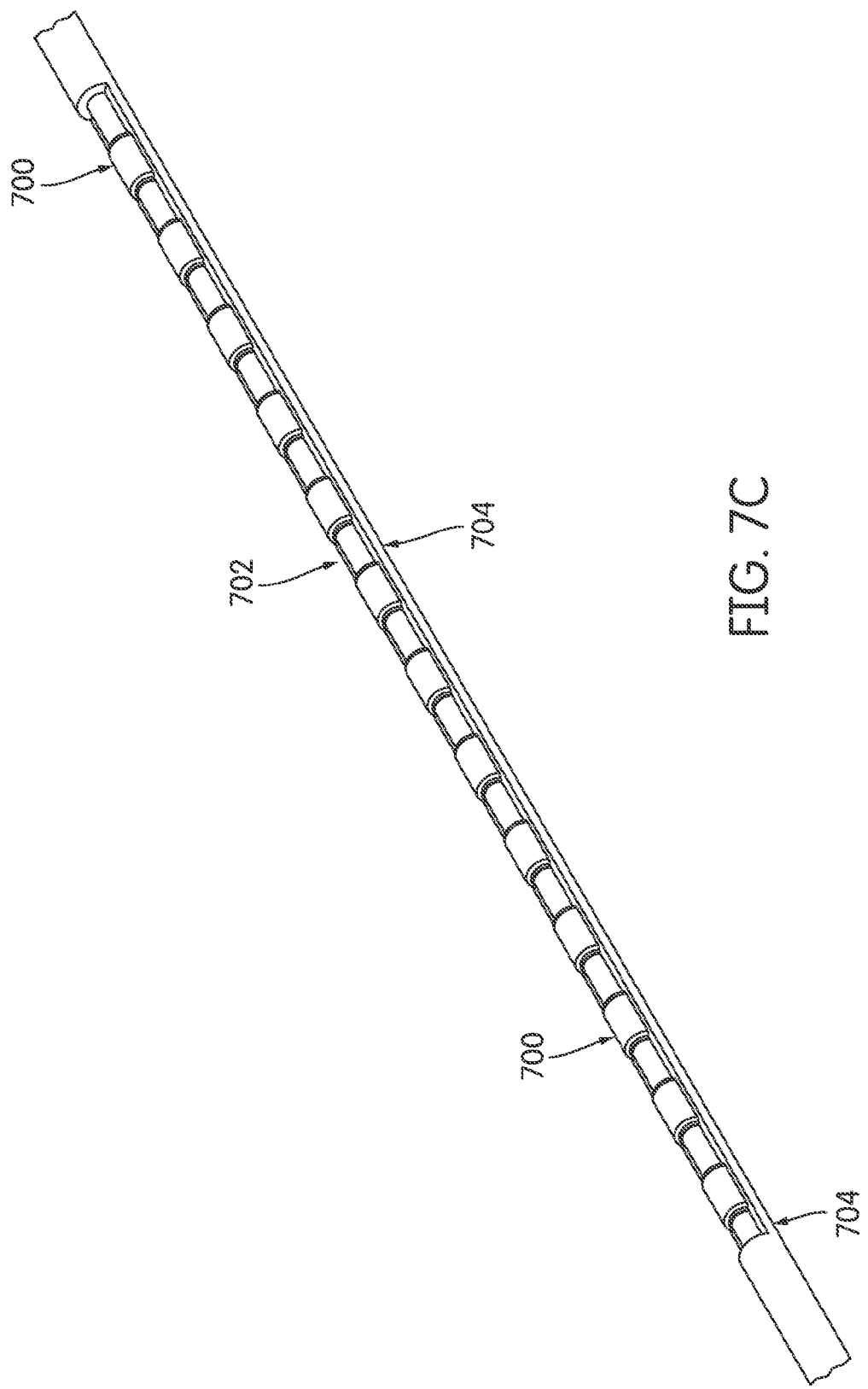
FIG. 7C is a perspective diagram showing the cable section 800 of FIG. 8 after the hydrophone group 700 has been aligned and molded in its proper place.

FIG. 7B is a perspective diagram showing the central cable 700 of FIG. 7A covered by the hydrophone group 600 of FIG. 6, as the hydrophone group 700 is being slipped over the central cable 700. FIG. 7C is a perspective diagram showing a cut-away view of the completed seismic cable. A first molding process (the "inner mold") 702 is then performed which attaches the hydrophone group to the central cable with a soft and pliable material that can accommodate the bending and elongation of the cable during use and storage. This may be performed with the central cable under tension in order to ensure concentricity of the strength members with the hydrophone array, and to ensure the overall strength of the inner mold. The intent is to locate and fix the hydrophones onto the central cable. The hydrophones may be positioned on the cable such that the direction of the wrap of the piezoelectric film alternates between successive hydrophones, in order to attenuate signals caused by longitudinal shear forces common to successive hydrophones.

Appropriate connectors are attached to the central cable. A second molding process (the "outer mold") 704 is then used to provide a flotation jacket over the hydrophone group 700. This may be performed with the central cable under tension in order to ensure concentricity of the strength members with the hydrophone array, and to ensure the overall strength of the outer mold.

Figure 8:
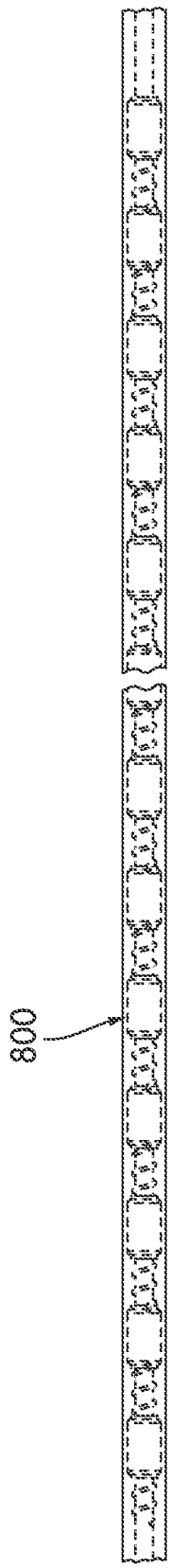
FIG. 8 is a perspective diagram illustrating the results of the outer flotation mold in accordance with an embodiment of the present invention.

FIG. 8 is a perspective diagram illustrating the results of the outer flotation mold in accordance with an embodiment of the present invention. The result is a streamer 800 with uniform diameter. The outer flotation mode mix can be chosen so that the overall buoyancy of the cable is typically neutral or positive in the conditions where the cable will be used. Type of water (e.g., fresh versus salt), temperature, and pressure, as well as other factors, can affect buoyancy. In one embodiment of the present invention, the outer flotation model mix is selected so that the cable floats (i.e., either neutral or positive buoyancy) in all possible conditions where the cable may reasonably used. This can obviously be changed based upon what those conditions are, as well as based on how wide a variety of conditions in which the cable is designed to be used. A combination of polyurethane materials, with the addition of glass microspheres or other buoyant fillers, can be used for this outer flotation mold in order to achieve the proper buoyancy.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A hydrophone comprising:
   a rigid tubular substrate;
   a tubular diaphragm affixed around the rigid tubular substrate, thereby defining an annular cavity around the rigid tubular substrate between the substrate and the diaphragm;
   a flexible piezoelectric element wrapped around and bonded to the flexible tubular diaphragm;
   a molded portion covering the piezoelectric element; and
   first and second rings, the first ring wrapped around one end of the rigid tubular substrate and the second ring wrapped around the other end of the rigid tubular substrate, with the tubular diaphragm located between the first and second rings;
   wherein the first ring includes a hole, and a wire grouping including at least first, second, and third wires travels through the hole.

2. The hydrophone of claim 1, wherein the first and second rings are molded or glued to the rigid tubular substrate.

3. The hydrophone of claim 1, wherein the flexible piezoelectric element is formed of Polyvinylidene fluoride film.

4. The hydrophone of claim 1, wherein the flexible piezoelectric element includes a combination of one or more electrode layers, Polyvinylidene fluoride film, and one or more insulating layers.

5. The hydrophone of claim 1, wherein the flexible piezoelectric element includes tabs to provide electric connection.

6. The hydrophone of claim 1, wherein the second and third wire are soldered to the tabs.

7. The hydrophone of claim 6, further comprising a piece of copper tape affixed to the rigid tubular surface.

8. The hydrophone of claim 7, wherein the first wire is soldered to the piece of copper tape.

9. A cable section comprising:
   a central cable;
   a plurality of the hydrophones of claim 1, wired together and slid over the central cable, wherein the hydrophones are bonded to the central cable; and
   an outer flotation mold formed around the central cable and the plurality of the hydrophones, wherein the outer flotation mold is composed of a material light enough to result in neutral or positive buoyancy of the cable section.

10. The cable section of claim 9, wherein the outer flotation mold is comprised of polyurethane material and glass microspheres.

11. The cable section of claim 9, wherein the hydrophones are positioned so that a direction of the piezoelectric film in each hydrophone alternates between successive hydrophones.

* * * * *